(12) United States Patent
Dawley

(10) Patent No.: US 7,541,696 B2
(45) Date of Patent: Jun. 2, 2009

(54) SYSTEMS AND METHODS FOR VOLTAGE SAG COMPENSATION

(75) Inventor: Robert Albert Dawley, Cary, NC (US)

(73) Assignee: Electronics Systems Protection, Inc., Zebulon, NC (US)

( * ) Notice: Subject to any disclaimer, the term of this patent is extended or adjusted under 35 U.S.C. 154(b) by 78 days.

(21) Appl. No.: 11/935,039

(22) Filed: Nov. 5, 2007

(65) Prior Publication Data

US 2009/0115254 A1    May 7, 2009

(51) Int. Cl.
*H02J 1/00* (2006.01)
(52) U.S. Cl. ..................................... 307/103
(58) Field of Classification Search ................. 307/103
See application file for complete search history.

(56) References Cited

U.S. PATENT DOCUMENTS

| 5,329,222 A | 7/1994 | Gyugyi et al. |
| 6,118,676 A | 9/2000 | Divan et al. |
| 7,112,898 B2 | 9/2006 | Brown et al. |

*Primary Examiner*—Robert L. Deberadinis
(74) *Attorney, Agent, or Firm*—Edell, Shapiro & Finnan, LLC

(57) ABSTRACT

A voltage sag compensation system includes a capacitor charging and discharging module connected to an AC rectifier and to an inverter, a two stage voltage detector configured to detect a degree of voltage sag that is present on a power line, and an inverter gating module selectively connectable to the power line in response to the two stage voltage detector and configured to provide gating signals to the inverter. The system further includes a low DC bus switch out module configured to monitor an output voltage of the capacitor charging and discharging module and to disable the inverter gating module from providing the gating signals to the inverter when voltage associated with the capacitor charging and discharging module falls below a predetermined value.

25 Claims, 5 Drawing Sheets

SYSTEMS AND METHODS FOR VOLTAGE SAG COMPENSATION

FIELD OF THE INVENTION

The present invention is related to electrical power systems, and more particularly to systems and methods for compensating for momentary voltage sag or dip on an electric power line.

BACKGROUND OF THE INVENTION

AC power systems, as is well-known in the art, provide electric power in the form of voltage and current that alternate between positive and negative polarities, typically following a sine wave with a predetermined amplitude and frequency. In the U.S., nominal amplitude is 120 volts RMS, at a frequency of 60 Hz. There are many types of electrical equipment, such as motors and relays that depend on quality power supply conditions to operate properly. More specifically, it is often critical that peak line voltage actually attain the expected nominal peak voltage to avoid, e.g., undesirable motor vibration or inadvertent relay switching, among other possible impacts of power line voltage fluctuations or transients.

When line voltage does not reach its nominal peak, it is said that a voltage sag (also known as "voltage dip") has occurred. A voltage sag, as understood by those skilled in the art, is a brief reduction in the voltage on an AC power system, typically on the order of about half a cycle (0.08 second) to a few seconds. A voltage sag is contrasted with an "undervoltage" condition that might last for, e.g., more than a few seconds.

From the basic power formula, power=voltage×current, it is known that for a given amount of power, a sudden increase in the amount of current being used will cause a corresponding decrease in the voltage supplying that current. Thus, for example, when a new load comes on line in a power system, that new load will sink a predetermined amount of current, thereby causing, at least momentarily (assuming no additional power can be instantaneously delivered), a corresponding reduction in voltage. Usually, such momentary voltage reductions are small enough that the voltage actually remains within normal tolerances, as utilities are adept at closely monitoring and controlling their power delivery systems. However, on occasion, when there is an unexpectedly large increase in current demand, or when system impedance is high, the voltage can drop significantly.

Although voltage sags can result from faults that occur in distant parts of a power system, many voltage sag events actually originate from within one's own facility. Some common causes of voltage sags include starting a large load, such as a motor or resistive heater, loose or defective wiring, and faults or short circuits in other equipment within the facility. The voltage sag phenomenon has been known for some time and there have been several documented devices to counteract this undesirable condition.

For example, U.S. Pat. No. 5,329,222 to Gyugyi et al. describes an apparatus for dynamic voltage restoration that includes a capacitive storage element and a controller that provides a corrective error signal based upon a deviation between the utility supply voltage and a nominal ideal voltage. Energy is then inserted in series to compensate for the line transient.

In the same field, U.S. Pat. No. 6,118,676 to Divan et al. discloses a dynamic voltage sag correction system that includes capacitive storage elements and line voltage monitoring. When a voltage sag condition is detected, a static bypass switch is opened, and a regulator storage module is controlled to provide a near normal output voltage signal to output terminals.

Other prior art patents describe voltage sag monitoring and compensation both in the DC and AC realm.

Notwithstanding these known systems, there remains a need to provide practical and rapid reaction voltage sag compensation systems and methodologies.

SUMMARY OF THE INVENTION

Described below are several embodiments of the present invention. Generally, embodiments of the present invention store a predetermined amount of charge on one or more capacitors, monitor a power line for voltage sag events, and upon detection of such an event, cause the charge on the capacitor(s) to feed an inverter that is gated in such a way as to produce AC voltage that is in phase with voltage present on the power line, and inject inverter generated voltage onto the power line in series therewith.

More specifically, in one embodiment, there is provided a voltage sag compensation system that includes a capacitor charging and discharging module that is connected to an AC rectifier, which may be powered by an AC power line, and to a DC-AC inverter. A two stage voltage detector is configured to detect a degree of voltage sag that is present on the power line and an inverter gating module is selectively connectable to the power line in response to the two stage voltage detector and is configured to provide gating signals to the inverter. A low DC bus switch-out module is also provided and is configured to monitor an output voltage of the capacitor charging and discharging module and to disable the inverter gating module from providing the gating signals to the inverter when voltage associated with the capacitor charging and discharging module falls below a predetermined value. In this way, when the capacitor charging and discharging module can no longer supply compensating power to the power line, the voltage sag compensation system is effectively electrically removed from an electrical circuit that includes the power line and an associated load.

In one implementation, the capacitor charging and discharging module is charged via an AC rectifier. Also, the two stage voltage detector may include a first stage and a second stage, wherein the first stage controls connection of the power line to the AC rectifier and to the inverter gating module. The second stage may control which one of two capacitors in the capacitor charging and discharging module is connected, in a first instance, directly to the inverter.

In accordance with an embodiment, one of the two capacitors is reinforced by another of the two capacitors through a control switch or circuit, which may include a field effect transistor (FET), such as a MOSFET. The inverter gating module may comprise optical isolators.

In a preferred embodiment, the two stage voltage detector is configured to detect a voltage sag of about 20% of nominal power line voltage and of about 40% of nominal power line voltage. The degree of voltage sag may also impact which of the two capacitors is initially directly connected to the DC-AC inverter.

In another embodiment, there is provided a voltage sag compensation device that is arranged to monitor a power line, to detect a voltage sag, and to provide compensating power to the power line (and any load connected thereto) for at least some amount of time. More specifically, the device includes a first capacitor having a first peak voltage and a second capacitor having a second peak voltage, where the second peak voltage is lower than the first peak voltage. The first capacitor and the second capacitor are configured to be charged via an AC rectifier when the voltage sag compensation device is connected to a power line.

A first voltage sag detector is configured to detect on the power line a voltage sag of a first predetermined value, and a second voltage sag detector is configured to detect on the power line a voltage sag of a second predetermined value, where the second predetermined value is greater than the first predetermined value.

A DC-AC inverter is arranged to transform DC power supplied by at least one of the first or second capacitors into AC power, and control switching, responsive to the first voltage sag detector and to the second voltage sag detector, is configured to, upon detection a voltage sag of the first predetermined value, disconnect the power line from the AC rectifier, disconnect the power line from a load being serviced by the power line, and cause the power line to drive a gating circuit associated with the inverter such that the inverter generates AC voltage that is substantially in phase with AC voltage present on the power line. The inverter generated voltage is arranged to be supplied to the load in series with the power line voltage. The control switching is further configured to, upon detection of a voltage sag of the second predetermined value, cause the inverter to receive power directly from the first capacitor.

In accordance with an embodiment of the invention, the second capacitor is reinforced by the first capacitor when a voltage on the second capacitor drops below a predetermined value.

In one aspect of this embodiment, the control switching monitors a DC bus that feeds the inverter with DC voltage.

An inductor may be connected to an output of the inverter through which the inverter generated voltage is supplied to the load.

In an actual implementation, the first voltage sag detector is configured to detect a voltage sag of about 20% of nominal power line voltage that may correspond to a voltage sag to about 95 volts.

The second voltage sag detector is configured to detect a voltage sag of about 40% of nominal power line voltage that may correspond to a voltage sag to about 70 volts.

In accordance with another embodiment of the present invention, there is provided a method of compensating for voltage sag on a power line that includes the steps of charging a first capacitor and a second capacitor using an AC rectifier connected to a power line, detecting, on the power line, a voltage sag of predetermined amount, disconnecting the power line from the AC rectifier and connecting the power line in such a way as to drive a gating circuit for a DC-AC inverter, inverting DC voltage supplied by at least one of the first capacitor or the second capacitor and applying resulting AC voltage to the power line in series therewith, and monitoring a voltage level of the DC voltage and disconnecting the power line from driving the gating circuit when the DC voltage is below a predetermined value.

The method may additionally include detecting a voltage sag of a first predetermined value and a voltage sag of a second predetermined value greater than the first predetermined value, and selecting one of the first capacitor or the second capacitor to supply DC voltage for the inverting step based on whether a given voltage sag is at least as great as the first predetermined value or at least as great as the second predetermined value.

The method may further include detecting a low voltage state of the second capacitor and closing a switch to allow the first capacitor to charge the second capacitor.

These and other features of embodiments of the present invention will be more fully appreciated upon a reading of the following detailed description in conjunction with the associated drawings.

DETAILED DESCRIPTION

Figure 1:
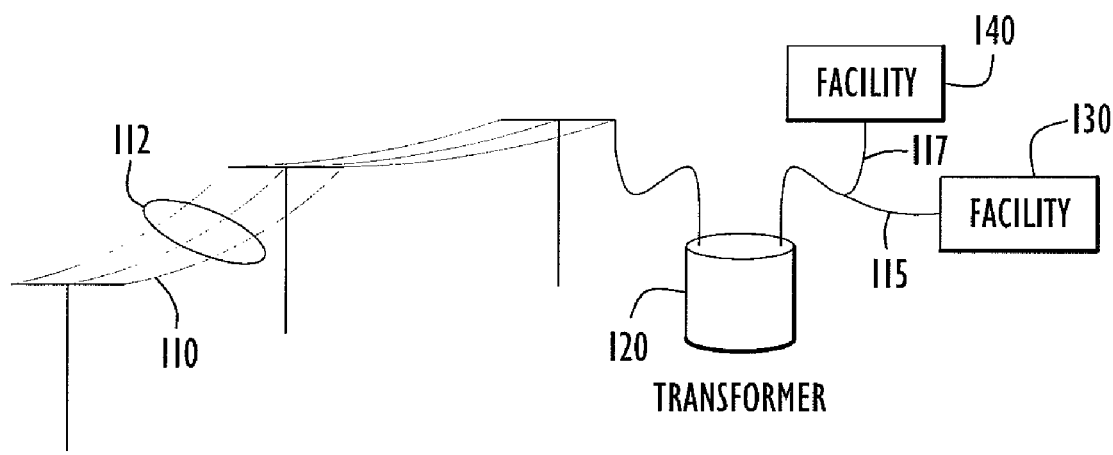
FIG. 1 is a schematic diagram of a basic power system in which the present invention may be utilized.

FIG. 1 is a schematic diagram of a basic power system 100 in which the present invention may be utilized. As shown, a utility power line 110, or a collection of power lines 112 for 3-phase power, is strung near a facility 130. A stepdown transformer 120 may be connected between the power line 110 and power line 115 that services facility 130 such that facility 130 is provided electrical power at an appropriate voltage level, e.g. 120V. Facility 130 may include electric machinery, relays, heaters, and control systems that receive power via power line 115. At the same time, another facility 140 (perhaps with similar types of electrical loads) may also be receiving electrical power from power line 110 via power line 117. Due to the periodic switching in and out of selected loads at either or both facilities 130, 140, as well as possible faulty wiring, unexpected short circuits, and the like, there may be instantaneous changes in the amount of electrical current that is drawn from power line 110. Such instantaneous changes in current often result in simultaneous instantaneous voltage reductions until such time as the utility that is supplying the electrical power can meet the electrical current demand.

Figure 2:
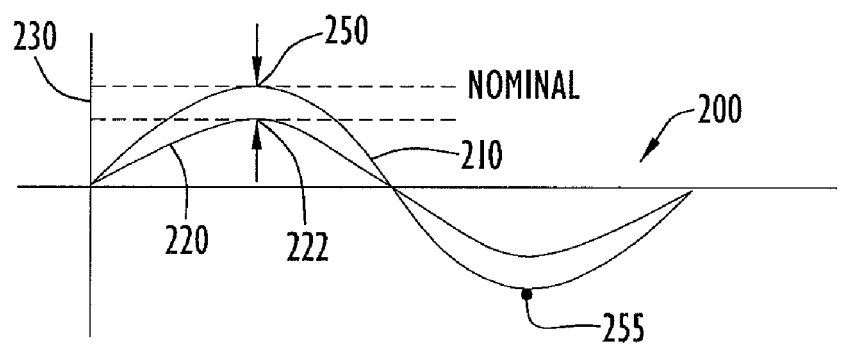
FIG. 2 depicts in graphical form a voltage sag or dip.

FIG. 2 depicts in graphical form a voltage sag or dip that might occur as a result of an instantaneous current draw that cannot be instantaneously supplied by an electrical utility at the instant in time. Graph 200 shows a nominal voltage versus time curve 210. This is a typical sinusoidal curve that alternates between positive and negative voltage peaks 250, 255. When a voltage reduction or sag occurs, the voltage peaks are no longer attained and a curve 220 appears to "sag" as compared to nominal curve 210. The amount of sag 230 is the difference between, e.g., the peak voltage 250 of nominal curve 210 and a peak 222 of the sagging or reduced voltage curve 220.

Figure 3:
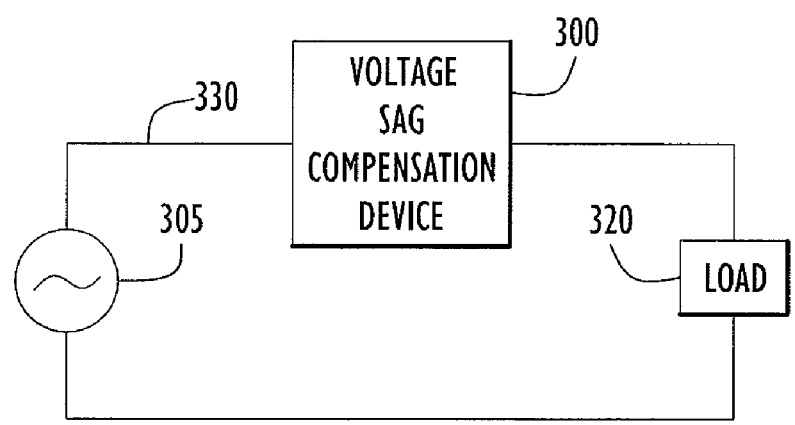
FIG. 3 is a schematic diagram of the location in a power system of a voltage sag compensation device in accordance with the present invention.

Voltage sag can be problematic in a number of situations. For example, control equipment, monitoring devices, relays, sophisticated electronics devices, and the like might react unpredictably in the presence of such an electrical power transient. Indeed, systems may unexpectedly shut down, or erroneous data may be generated as a result of voltage sag. To address voltage sag, and prevent, or at least reduce, its potential consequences, a voltage sag compensation system is preferably located close to equipment that may be particularly sensitive to such events. More specifically, FIG. 3 is a schematic diagram of a possible location in a power system for a voltage sag compensation device 300 in accordance with the present invention. As shown, voltage sag compensation device 300 is located near a potentially sensitive load 320 that is powered by an electrical power source 305 via line 330. As will be appreciated more fully in connection with a description of an exemplary electrical circuit of the voltage sag compensation device 300, when a voltage sag condition is detected on line 330, electrical power, in-phase with electrical power source 305, is preferably added to line 330 such that load 320 is substantially masked from the voltage sag event.

Figure 4:
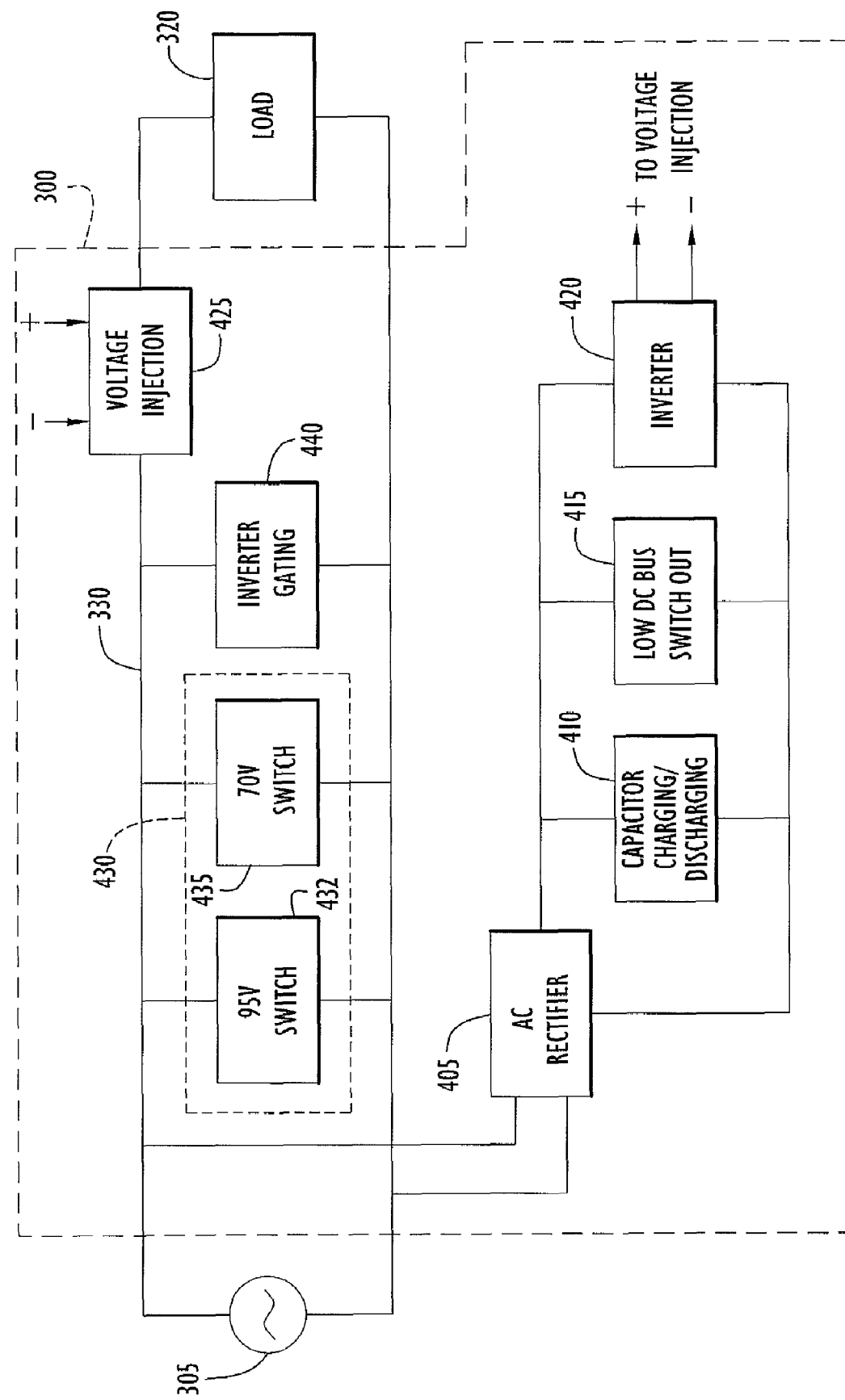
FIG. 4 is a block diagram that shows components of a voltage sag compensation device in accordance with the present invention.

FIG. 4 is a high level block diagram that shows components of the voltage sag compensation device 300 in accordance with an embodiment of the present invention. A more detailed circuit diagram will be described later herein with reference to FIG. 5. FIG. 4 shows electrical power source 305 that supplies electric power to load 320. The ultimate goal of voltage sag compensation device 300 is to detect a voltage sag on power line 330 and to quickly inject additional power, in series with power source 305, to "bump up," boost, or compensate for the sagging voltage, and thereby mask the event from load 320.

To accomplish this, an AC rectifier 405, during periods of nominal voltage supply on power line 330, supplies DC current to capacitor charging/discharging module 410 to electrically charge one or more capacitors (C1 and C2 in FIG. 5) that are, at the appropriate time, tapped and discharged when a voltage sag occurs. A low DC bus switch-out module 415 monitors the voltage on the one or more capacitors and, if the capacitor(s) are discharged beyond a predetermined amount (and are thus no longer able to provide sufficient compensating voltage), operates to preclude any further power from being delivered from voltage sag compensation device 300 to load 320.

In order for the DC voltage and current (i.e., power) from the capacitor charging/discharging module 410 to be supplied in a useful manner to AC power line 330, an inverter 420 converts the compensating power from the capacitors to an AC signal. The phase of this AC signal is matched to the actual phase of the AC voltage appearing on power line 330 by providing gating signals to inverter 420 based on gating signals received from an inverter gating module 440 that is electrically connected to power line 330. An output of inverter 420, which may be a square wave or a signal that has been filtered to resemble or approach a sinusoidal pattern, is provided to a voltage injection point 425, which is configured to apply the compensation voltage in series with the voltage appearing on power line 330.

As mentioned above, the charge stored in the capacitor(s) in the capacitor charging and discharging module 410 is tapped at an "appropriate time." More specifically, when the voltage sag compensation device 300 detects a voltage sag on power line 330, a combination of relays (described later with reference to FIG. 5) causes the capacitor(s) to be discharged into the inverter 420, such that compensation power is applied to power line 330. In an actual implementation of the present invention, and by way of a non-limiting example only, a two stage detector 430 is provided to detect the degree of voltage sag that is present on power line 330. A first stage, a 95 volt switch 432, determines if the voltage on power line 330 has dipped below 95 volts, and a second stage, a 70 volt switch 435, determines if the voltage on power line 330 has dipped below 70V. As will be explained more fully below, depending on the degree and duration of the voltage sag, different aspects of the voltage sag compensation device 300 are enabled or disabled.

Figure 5:
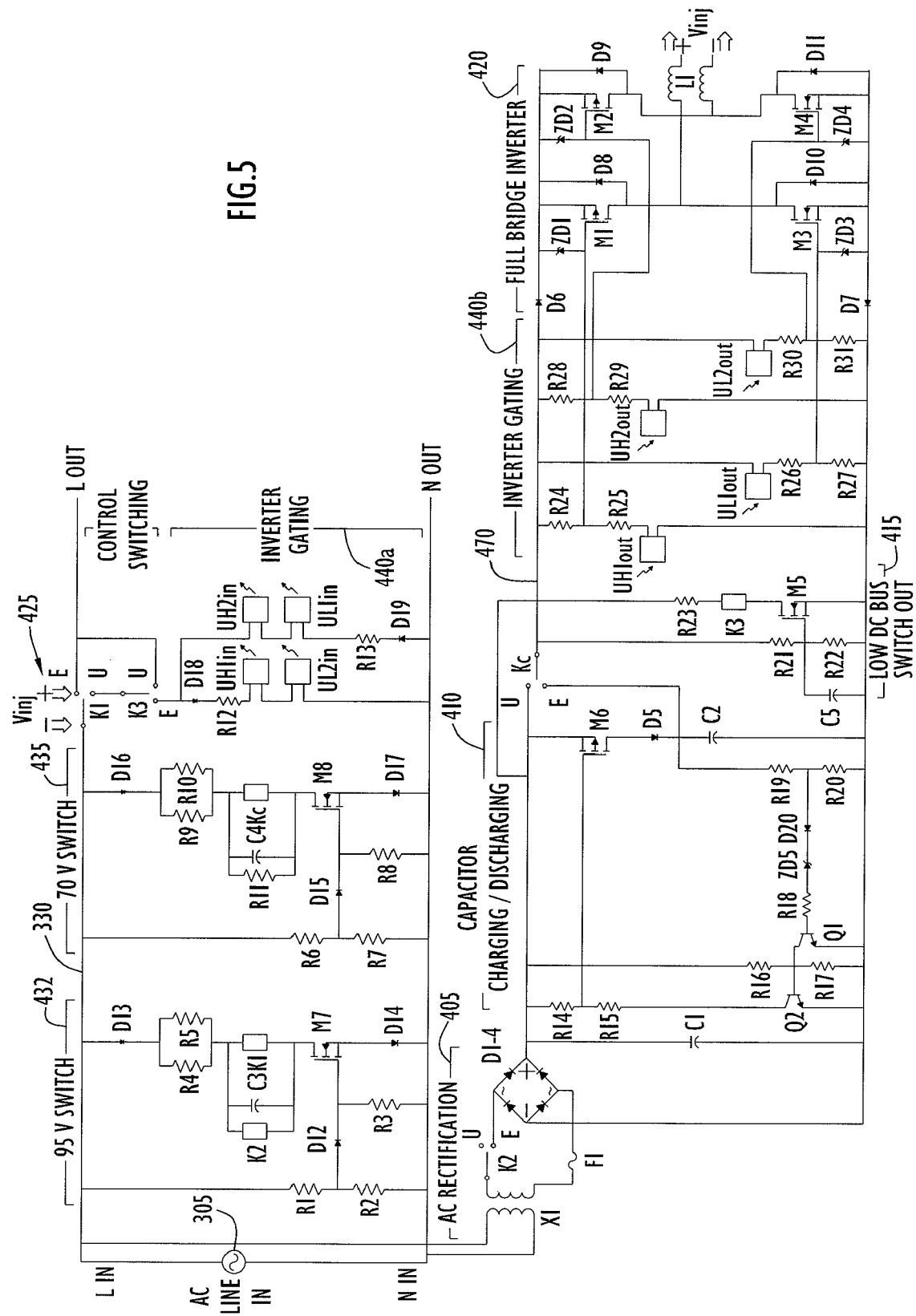
FIG. 5 is a detailed circuit diagram of an exemplary implementation of a voltage sag compensation device in accordance with the present invention.

Reference is now made to FIG. 5, which is a detailed circuit diagram of an exemplary implementation of voltage sag compensation device 300 in accordance with an embodiment of the present invention. Voltage sag compensation device 300, as explained, preferably briefly restores power line voltage at an electric load to a point close to nominal during a voltage sag event. This is accomplished by adding the output of a DC-AC inverter, i.e., inverter 420, to the sagging power line voltage. In a specific implementation, the compensation device 300 preferably provides two discrete voltage injection levels: approximately 85V peak and 50V peak. A first low voltage threshold trip point is set to about 95 Vac, or 20% sag (sag to 80% nominal) and a second low voltage trip point is set to about 70 Vac, or 40% sag (sag to 60% nominal). When these thresholds are crossed, energy stored in two large capacitors is converted to a square wave which, when summed with the lessened line voltage, yields a very close to sinusoidal boosted AC voltage at the load side. The voltage sag compensation device 300 in accordance with the present invention is preferably able to perform the process of detecting a low line voltage and providing compensation in about 1 cycle (i.e., 16 msec).

The components depicted in FIG. 5 and their functions will now be described in detail.

95V Switch

When voltage on power line 330 becomes lower than, e.g., 95 Vac (rms) (i.e., a voltage sag of at least a first predetermined value is detected), relays K1 and K2 become unenergized. In FIG. 5, energized relay positions are indicated by an "E" and unenergized relay positions are indicated by a "U." More specifically, the voltage divider of R1, R2 controls the gate of MOSFET M7 to be low such that MOSFET M7 stops conducting and de-energizes both K1 and K2. This action opens power line 330 at the voltage injection location 425, removes charging transformer X1, which is part of AC rectifier 405 (which also includes full wave bridge rectifier comprising D1-D4), and begins the compensation process (as long as the DC bus voltage level is high enough). The 95V switch 432 is considered the first voltage trip point. R3 is provided to hasten the turning off of MOSFET M7 by bleeding off excess gate charge. Diodes D12 and D13 perform rectifier function to provide a DC voltage component to both MOSFET M7 Gate and relay coils K1 and K2. Diode D14 adjusts the Gate-Source voltage of MOSFET M7. Capacitor C3 provides smoothing of the DC voltage across relay coils K1 and K2. The equivalent resistance of R4/R5 sets the appropriate magnitude of the DC voltage across relay coils K1 and K2. Those skilled in the art will appreciate that R4/R5 may be replaced by a single equivalent resistor.

70V Switch

A circuit arrangement similar to the 95V switch 432 is provided for the 70V switch 435, but this latter circuit controls relay Kc. When the voltage on power line 330 becomes lower than 70 Vac (rms) (i.e., a voltage sag of at least a second predetermined value is detected) as detected by voltage divider R6/R7, relay Kc becomes unenergized, switching the DC bus from the 50V capacitor C2 to the 85V capacitor C1. Diodes D15 and D16 perform rectifier function to provide a DC voltage across relay coil Kc and at the Gate of MOSFET M8, diode D17 adjusts the Gate-Source voltage of MOSFET M8, capacitor C4 performs smoothing of the DC voltage across relay coil Kc, the equivalent resistance of R9/R10 (or a single equivalent resistor) and the resistance of R11 set the magnitude of the voltage across relay coil Kc, and R8 bleeds off excess current on the gate of M8. The 70V switch 435 thus controls a second voltage trip point.

Control Switching

A two relay configuration comprising K1 and K3 ensures that compensation voltage is supplied only when both the power line 330 voltage is low (K1) and the DC bus voltage is high (K3). This relay configuration also ensures that voltage compensation is never attempted unless the power line 330 is opened at the voltage injection location 425.

Inverter Gating

In a preferred embodiment, a relatively simple gate drive circuit is implemented for four MOSFETs M1-M4 of the inverter 420. On the AC side, half rectified AC (as a consequence of diodes D18 and D19) switches optical isolator relays UH1in/UH1out, UH2in/UH2out, UL1in/UL1out, and UL2in/UL2out, which then switch DC voltage (supplied by C1 or C2) to the gates of the MOSFETs M1-M4. D6-D11 ensure proper current direction. Zener diodes ZD1-ZD4 ensure that the gates of the MOSFETs M1-M4 are not overdriven. Voltage dividers R24/R25, R26/R27, R28/R29, and R30/R31 supply the appropriate gate voltage to MOSFET gates to which they are respectively connected. As a result of the gating circuit described herein, the inverter boost voltage will always be substantially in phase with the power line 330 voltage. It should be noted, however, that this particular circuit for implementing inverter 420 will not generate proper gating signals when power line 330 voltage approaches zero as the optical isolators will not function at low voltage levels. Although optical isolator relays are described for monitoring voltage phase, other types of devices or alternative circuitry may also be employed. For example, digital electronics may be used to trigger the gating circuitry. Those skilled in the art will appreciate that still other alternative embodiments are possible.

AC Rectifier

In a preferred embodiment, transformer X1 drops the voltage of power line 330 voltage to half (such that capacitor C1 charges to peak, or 85 Vdc). Transformer X1 also provides isolation from the main conductors, and allows for slower capacitor charging as a result of the lower ac voltage available for rectification. During normal operating conditions, i.e., when the line voltage is normal and all relays K1, K2, K3, Kc are energized, capacitors C1 and C2 are charged, and minimal current is flowing out of the transformer X1 secondary to maintain that charge. In compensation mode, the transformer X1 is removed from the circuit by relay K2 to prevent current overload. The fuse F1 provides protection in the event of a failure (mostly against a possible fire hazard) if the compensation device 300 fails. Such a failure might include the possibility that one or more of the MOSFETs M1-M4 is shorted, which in turn will short one or both capacitors C1, C2. The transformer X1 will provide increasing current to the short circuit until the fuse F1 opens. Even under such a short-circuit failure condition, the load 320 will be protected by the operation of relay K3: The shorted capacitor(s) will discharge very rapidly, and any unshorted capacitor will discharge somewhat less rapidly by virtue of parallel connected impedances, and relay coil K3 will quickly become unenergized, switching K3 to position U. There is no chance for K3 to become re-energized since fuse F1 is open. At this point, the sag compensation device 300 may be inoperable, but will not pose a safety hazard, and the load will still be connected to the mains.

Capacitor Charging/Discharging

When the voltage on capacitor C2 is low, Q1 is OFF, Q2 is ON, and MOSFET M6 is ON. The P-channel MOSFET M6 conducts until capacitor C2 is charged to 50V, then Q1 turns ON, turning Q2 OFF, turning MOSFET M6 OFF. If connected directly to a high voltage source, current inrush might destroy M6 and not limit the maximum voltage on C2, but in this device the isolation transformer X1 charging large parallel capacitors works well with this charging circuit. The reduced ac voltage (about ½ mains) at the secondary side of transformer X1 charges C1 to 85V more slowly than if the rectifier were connected directly to mains (as well as limits the voltage on C1 to about 85V). While C1 is charging, M6 turns ON, which connects the additional sink of C2. C2 begins charging from C1, further slowing C1's charging, and both capacitors gradually approach their steady-state values. Another function of the capacitor charging/discharging circuit 410 is enabled during compensation of a smaller voltage sag (i.e., trip point 1, sag to between 70 and 95 Vac rms) wherein the 50V capacitor C2 is reinforced by capacitor C1 through M6 until C1 can no longer supply energy to C2. With the use of two separate capacitors charged to different voltages, it is possible to provide compensation voltage at a voltage level appropriate for the degree of voltage sag appearing on power line 30.

Low DC Bus Switch Out

When capacitors C1, C2 have discharged to the point where they are no longer useful for voltage boosting, it is preferable to turn the compensator off by stopping the gating signal generation, and re-closing the line conductor 330 at the voltage injection point 425. Both functions are performed by relay K3, which is turned on and held on by two (possibly different) DC voltages: the 85V C1 and 50V C2. If the DC bus 470 is connected to C1 (85V), both the Gate-Source voltage of MOSFET M5 and relay coil K3 are dependent on the voltage on C1. Both of these voltages fall as the voltage on C1 falls, resulting in relay K3 switching to the unenergized state. If the 50V capacitor C2 is connected to the DC bus, K3 is unenergized by M5 turning off, since the voltage on the relay coil K3 is essentially held constant by capacitor C1. Both scenarios open K3 around 30 Vdc. Capacitor C5 is included to keep M5 on while Kc is switching.

Full Bridge MOSFET Inverter

The inverter 420 is a well-known topology for converting DC voltage to AC. The design is simplified by using two P-Channel MOSFETs in addition to 2 N-Channel MOSFETs, although a 4 N-Channel configuration may have lower conduction losses and possibly lower cost, although the driving infrastructure would be more complex. A 20 A ferrite core toroidal inductor may be used for L1, but the inductor may not be necessary, especially since there is no high frequency switching. The Zener diodes (ZD1, ZD2, ZD3, ZD4) provide protection for the MOSFETs M1-M4, since they may be damaged by a |Vgs|>20V.

The following is a list of circuit components and their respective values that may be used in an actual implementation of the circuit shown in FIG. 5.

| | |
|---|---|
| MOSFET (M1, M2, M6) | P-Channel 100 V/40 A |
| MOSFET (M3, M4, M5, M7, M8) | N-Channel 150 V/40 A |
| Capacitor (C1) | 20 mF/100 V |
| Capacitor (C2) | 50 mF/75 V |
| Capacitor (C3, C4) | 3.3 uF/100 V |
| Capacitor (C5) | 33 uF/63 V |
| Transistor (Q1, Q2) | NPN 400 V KSP44 |
| Zener diode (ZD1, ZD2, ZD3, ZD4) | 20 V |
| Zener diode (ZD5) | 7.5 V |
| Relay (K1, K2, K3, Kc) | 20 A min |
| Diode (D1-D11) | 20 A/400 V |
| Diode (D12-D20) | 1N4005 |

-continued

| | |
|---|---|
| Optical isolator UH1, UH2, UL1, UL2) | Vload 350 V min |
| Resistors (R1, R6, R15, R16, R19, R21, R25, R26, R29, R30) | 100 kohm, ½ W |
| Resistor (R2) | 4.2 kohm, ¼ W |
| Resistor (R3) | 22 kohm, ¼ W |
| Resistor (R4, R5, R9, R10, R23) | 3.6 kohm, 2 W |
| Resistor (R7) | 7.7 kohm, ¼ W |
| Resistor (R8) | 14.7 kohm, ¼ W |
| Resistor (R11) | 5 kohm, 2 W |
| Resistor (R12, R13) | 13 kohm, 1 W |
| Resistor (R14, R24, R27, R28, R31) | 24 kohm, ¼ W |
| Resistor (R17) | 26 kohm, ¼ W |
| Resistor (R18) | 1 kohm, ½ W |
| Resistor (R20) | 20 kohm, ¼ W |
| Resistor (R22) | 10 kohm, ¼ W |
| Inductor (L1) | 20 A ferrite core (1 mH) |
| Transformer (X1) | Isolation 115/230 50 VA |
| Fuse (F1) | 5 A |

Figure 6:
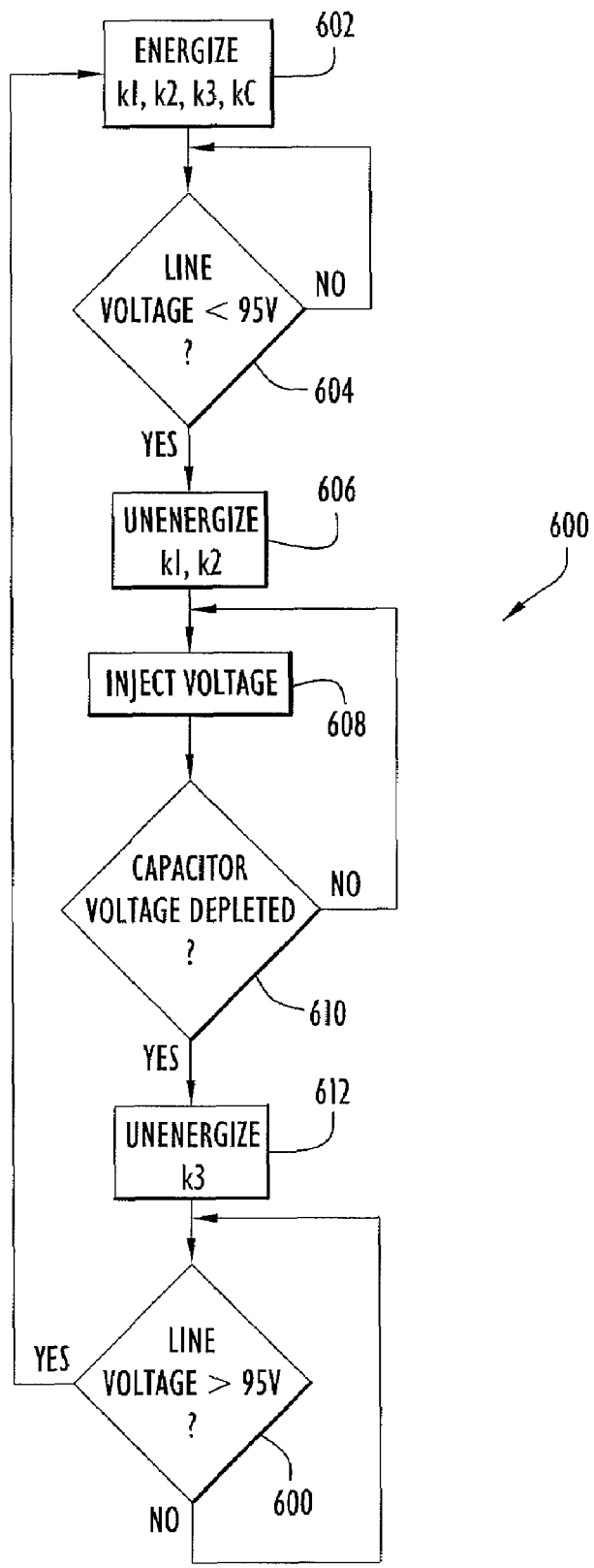
FIGS. 6 and 7 depict, respectively, exemplary series of steps for performing a voltage sag compensation method for different levels of voltage sag in accordance with the present invention.

Reference is now made to FIG. 5 and FIG. 6 as well as Table 1 below, which shows relay states for several different scenarios of line voltage detected by the voltage sag compensation device 300 of the present invention. Table 1 represents operation of the device with a load current of 15 A. Higher load currents will result in voltage sag compensation over a shorter amount of time or fewer cycles, while lower load currents will result in voltage sag compensation over a longer period of time or more cycles. The length of time that compensation may be provided is determined, almost exclusively, by the size of the capacitors that are used for power storage. Thus, those skilled in the art will appreciate that the use of larger capacitors would enable the voltage sag compensation device 300 of the present invention to supply compensation voltage over a greater length of time.

As shown in FIG. 6, a method 600 begins at step 602 with all of the relays K1, K2, K3, and Kc energized. This is the state of the device 300 when voltage on line 300 is greater than 95V and the 95V switch 432 has not been tripped. More specifically, the voltage divider of R1/R2 has not caused M7 to stop conducting, thereby keeping K1 and K2 energized. Kc is energized for the same reason, as the voltage divider of R6/R7 of the 70V switch 435 has also not stopped M8 from conducting at this point. K3 remains energized in this state as well as a result of the voltage divider R21/R22 controlling the gate of M5. As indicated by step 604, this state of the device remains the same until the voltage on power line 330 dips below 95V causing changes to the states of K1 and K2.

TABLE 1

Relay states for 15 A load current

| Line Voltage (VL) | Duration | K1 | K2 | K3 | Kc |
|---|---|---|---|---|---|
| 95 < VL < 120 | No compensation | E | E | E | E |
| 70 < VL < 95 | t < 8 cycles | U | U | E | E |
| 70 < VL < 95 | t > 8 cycles | U | U | U | E |
| VL < 70 | t < 4 cycles | U | U | E | U |
| VL < 70 | t > 4 cycles | U | U | U | U |

As soon the voltage sags below 95V, K1 and K2 are tripped or switched to an unenergized state wherein the power line 330 is opened at the voltage injection location 425 and the AC rectifier 405 is disconnected from the line voltage. Almost instantaneously, once the state of these relays (K1, and K2) has been changed, energy from capacitors C1 and C2 is transformed into a square wave through inverter 420 and applied through, e.g., L1, in series to the open connection of power line 330 in the voltage injection location 425. This event is represented by step 608 in FIG. 6. Because the capacitors C1 and C2 can only store a finite amount energy, they will shortly become sufficiently discharged that they can no longer provide boosting voltage to power line 330. Step 610 is a decision point to determine whether capacitor voltage has been depleted beyond a predetermined level. That level is set by voltage divider R21/R22 which controls the gate of M5, thereby controlling the state of K3.

If, at step 610, the voltage of the capacitors remains sufficiently high, then the voltage sag compensation device 300 continues to supply compensation voltage to the voltage injection location 425. If, on the other hand, it is determined at step 610 that the voltage on the capacitors is now too low, K3 will become unenergized. For a 15 A load, about 8 cycles of the AC signal on power line 330 will have passed before K3 will switch. The switching of K3 is shown by step 612. As shown in FIG. 5, K3 controls whether the AC signal on power line 330 is fed to inverter gating 440. Once the capacitors C1 and C2 are depleted there is no need for the voltage sag compensation device to be operative in respect to its main function. Accordingly, an unenergized K3 causes power line 330 to once again be connected directly to load 320, thereby removing any possibility of the voltage sag compensation device proving further energy (which is, in any event, at this point no longer available) to load 320.

At step 614 it is determined whether the line voltage has increased to above 95V. If so, then process 600 returns to a state where all four relays are energized at step 602 and capacitors C1 and C2 can recharge. Step 614 continues to cycle until such time as the line voltage exceeds 95V.

Figure 7:
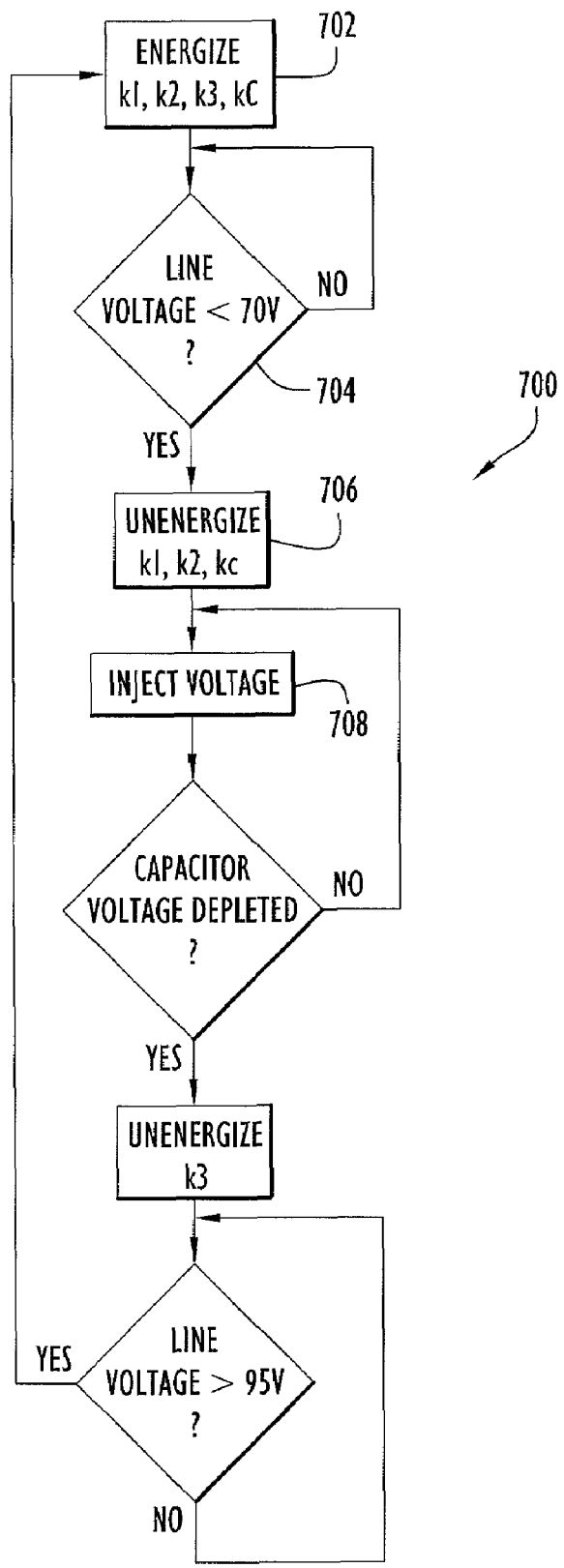

In the scenario just described, relay Kc was not employed, i.e., it remained energized throughout the process. FIG. 7 shows a process 700 that includes the use of relay Kc when line voltage sags below 70V, and remains there for a predetermined amount of time.

More specifically, process 700 begins like process 600 wherein all relays K1, K2, K3, and Kc are energized (step 702). If, at step 704, the line voltage of power line 330 dips not only below 95V but also below 70V, then both the 95V switch 432 and 70V switch 435 are tripped. In this case, at step 704, relays K1, K2 (as in process 600) as well as relay Kc are unenergized. The effect of an unenergized Kc is to immediately and continuously include capacitor C1 (85V) in providing power to inverter 420, and thus for voltage injection, as indicated by step 708.

At step 710 it is determined if the capacitor voltage has been depleted. If not, voltage injection continues at step 708. On the other hand, if the capacitor power has been depleted, then at step 712, K3 is further unenergized, as in process 600, thereby precluding voltage sag compensation device 300 from further interacting with load 320. When there is a 70V sag (at 15 A load current), device 300 is able to supply compensation voltage for no more than 4 cycles (based on the selected capacitors), as indicated in Table 1 above. Finally, as indicated by step 714, the relays all remain unenergized until the line voltage again exceeds 95V.

Testing

As mentioned, the amount of time the voltage sag compensation device 300 of the present invention can effectively boost the line voltage to an acceptable level is dependent on the amount of energy stored in the storage capacitors and the amount of load current during the sag event. Table 2 below summarizes results of performance testing of the device as implemented according to the description herein (time compensated does not include the 1 cycle time for detection and engaging).

TABLE 2

Voltage Sag Compensation at Different Load Currents and Degree of Sag

| Load Current at 120 VAC | Voltage Sag (% Nominal) | Sag Voltage | Time Duration Compensated to within +-10% Nominal (RMS) (msec) | Time Duration Compensated to within +-10% Nominal (RMS) (cycles) | Time Duration Compensated to within +10%, -20% Nominal (RMS) (msec) | Time Duration Compensated to within +10%, -20% Nominal (RMS) (cycles) |
|---|---|---|---|---|---|---|
| 20 | 75% | 90 | 87.2 | 5.23 | 99.6 | 5.98 |
| 20 | 70% | 84 | 82 | 4.92 | 95 | 5.7 |
| 20 | 50% | 60 | 26 | 1.56 | 50 | 3 |
| 15 | 75% | 90 | 123.2 | 7.39 | 135.4 | 8.12 |
| 15 | 70% | 84 | 121.6 | 7.3 | 134.6 | 8.08 |
| 15 | 50% | 60 | 39 | 2.34 | 66.4 | 3.98 |
| 10 | 75% | 90 | 218.8 | 13.13 | 238.2 | 14.29 |
| 10 | 70% | 84 | 220 | 13.2 | 242.6 | 14.56 |
| 10 | 50% | 60 | 62.6 | 3.76 | 107.4 | 6.44 |
| 5 | 75% | 90 | 465.6 | 27.94 | 487.4 | 29.24 |
| 5 | 70% | 84 | 463.2 | 27.79 | 502.2 | 30.13 |
| 5 | 50% | 60 | 138.4 | 8.3 | 212.2 | 12.73 |

From the foregoing, it can be readily seen that the voltage sag compensation device 300 of the present invention is capable of boosting a sagging voltage power line for different lengths of time depending on load current.

The systems and methods described herein may be embodied in other specific forms without departing from the spirit or essential characteristics thereof. The foregoing embodiments are therefore to be considered in all respects illustrative and not meant to be limiting.

What is claimed is:

1. A voltage sag compensation device, comprising:
   a first capacitor having a first peak voltage and a second capacitor having a second peak voltage, the second peak voltage being lower than the first peak voltage, the first capacitor and the second capacitor being configured to be charged via an AC rectifier when the voltage sag compensation device is connected to a power line;
   a first voltage sag detector configured to detect on the power line a voltage sag of a first predetermined value, and a second voltage sag detector configured to detect on the power line a voltage sag of a second predetermined value, the second predetermined value being greater than the first predetermined value;
   an inverter arranged to transform DC power supplied by at least one of the first or second capacitors into AC power; and
   control switching, responsive to the first voltage sag detector and to the second voltage sag detector, configured to, upon detection of a voltage sag of the first predetermined value, disconnect the power line from the AC rectifier, disconnect the power line from a load being serviced by the power line, and cause the power line to drive a gating circuit associated with the inverter such that the inverter generates AC voltage that is substantially in phase with AC voltage present on the power line which inverter generated voltage is arranged to be supplied to the load in series with the power line voltage, and further configured to, upon detection of a voltage sag of the second predetermined value, cause the inverter to receive power directly from the first capacitor.

2. The device of claim 1, wherein the second capacitor is reinforced by the first capacitor when a voltage on the second capacitor drops below a predetermined value.

3. The device of claim 2, wherein the second capacitor is reinforced through a field effect transistor (FET).

4. The device of claim 1, wherein the control switching is further configured to monitor a voltage level of at least one of the first capacitor or second capacitor and to reconnect the power line to the load and disconnect the power from the gating circuit.

5. The device of claim 4, wherein the control switching monitors a DC bus that feeds the inverter.

6. The device of claim 1, wherein the gating circuit comprises optical isolators.

7. The device of claim 1, further comprising an inductor connected to an output of the inverter and through which the inverter generated voltage is supplied to the load.

8. The device of claim 1, wherein the first voltage sag detector is configured to detect a voltage sag of about 20% of nominal power line voltage.

9. The device of claim 8, wherein the voltage sag is to about 95 volts.

10. The device of claim 1, wherein the second voltage sag detector is configured to detect a voltage sag of about 40% of nominal power line voltage.

11. The device of claim 10, wherein the voltage sag is to about 70 volts.

12. A voltage sag compensation system, comprising:
   a capacitor charging and discharging module connected to an AC rectifier and to an inverter;
   a two stage voltage detector configured to detect a degree of voltage sag that is present on a power line;
   an inverter gating module selectively connectable to the power line in response to the two stage voltage detector and configured to provide gating signals to the inverter; and
   a low DC bus switch out module configured to monitor an output voltage of the capacitor charging and discharging module and to disable the inverter gating module from providing the gating signals to the inverter when voltage associated with the capacitor charging and discharging module falls below a predetermined value.

13. The system of claim 12, wherein the capacitor charging and discharging module is charged via an AC rectifier.

14. The system of claim 13, wherein the two stage voltage detector includes a first stage and a second stage, and the first stage controls connection of the power line to the AC rectifier and to the inverter gating module.

15. The system of claim 12, wherein the two stage voltage detector includes a first stage and a second stage, and the second stage controls which one of two capacitors in the capacitor charging and discharging module is connected directly to the inverter.

16. The system of claim 15, wherein one of the two capacitors is reinforced by another of the two capacitors.

17. The system of claim 16, wherein the one of the two capacitors is reinforced through a field effect transistor (FET).

18. The system of claim 12, wherein the inverter gating module comprises optical isolators.

19. The system of claim 12, wherein the two stage voltage detector is configured to detect a voltage sag of about 20% of nominal power line voltage.

20. The system of claim 12, wherein the two stage voltage detector is configured to detect a voltage sag of about 40% of nominal power line voltage.

21. A method of compensating for voltage sag on a power line comprising:

charging a first capacitor and a second capacitor using an AC rectifier connected to a power line;

detecting, on the power line, a voltage sag of a predetermined amount;

disconnecting the power line from the AC rectifier and connecting the power line in such a way as to drive a gating circuit for a DC-AC inverter;

inverting DC voltage supplied by at least one of the first capacitor or the second capacitor and applying resulting AC voltage to the power line in series therewith; and monitoring a voltage level of the DC voltage and disconnecting the power line from driving the gating circuit when the DC voltage falls below a predetermined value.

22. The method of claim 21, further comprising detecting a voltage sag of a first predetermined value and a voltage sag of a second predetermined value greater than the first predetermined value, and selecting one of the first capacitor or the second capacitor to supply DC voltage for said inverting step based on whether a given voltage sag is at least as great as the first predetermined value or at least as great as the second predetermined value.

23. The method of claim 21, wherein the gating circuit employs optical isolators.

24. The method of claim 21, further comprising reinforcing a charge of the second capacitor using the first capacitor.

25. The method of claim 24, further comprising detecting a low voltage state of the second capacitor and closing a switch to allow the first capacitor to charge the second capacitor.

* * * * *